(12) United States Patent
DAmelia

(10) Patent No.: US 9,400,845 B2
(45) Date of Patent: Jul. 26, 2016

(54) PROVIDING INTELLIGENT SERVICE PROVIDER SEARCHING AND STATISTICS ON SERVICE PROVIDERS

(71) Applicant: FERRANDINO & SON INC., Farmingdale, NY (US)

(72) Inventor: Philip DAmelia, Nesconset, NY (US)

(73) Assignee: FERRANDINO & SON INC., Farmingdale, NY (US)

( * ) Notice: Subject to any disclaimer, the term of this patent is extended or adjusted under 35 U.S.C. 154(b) by 200 days.

(21) Appl. No.: 14/016,593

(22) Filed: Sep. 3, 2013

(65) Prior Publication Data

US 2015/0066885 A1 Mar. 5, 2015

(51) Int. Cl.
*G06F 17/30* (2006.01)

(52) U.S. Cl.
CPC .............................. *G06F 17/30867* (2013.01)

(58) Field of Classification Search
USPC .................................. 707/706, 722–723, 748
See application file for complete search history.

(56) References Cited

U.S. PATENT DOCUMENTS

| | | | | |
|---|---|---|---|---|
| 7,406,465 B2 * | 7/2008 | Jones | ...................... | G06Q 30/02 |
| 7,668,854 B2 * | 2/2010 | Karstens | ........... | G06F 17/30722 707/705 |
| 8,051,076 B1 * | 11/2011 | Garg | ................. | G06F 17/30864 707/723 |
| 8,380,709 B1 * | 2/2013 | Diller | .................. | G06F 17/3053 707/723 |
| 8,832,083 B1 * | 9/2014 | Chen | ............................. | 707/723 |
| 2003/0115187 A1 * | 6/2003 | Bode | ................. | G06F 17/30672 |
| 2004/0122807 A1 * | 6/2004 | Hamilton | .......... | G06F 17/30646 |
| 2006/0179052 A1 * | 8/2006 | Pauws | ................ | G06F 17/30985 |
| 2006/0271524 A1 * | 11/2006 | Tanne | ................ | G06F 17/30864 |
| 2007/0019864 A1 * | 1/2007 | Koyama | ............ | G06F 17/30247 382/218 |
| 2007/0078851 A1 * | 4/2007 | Grell et al. | ........................ | 707/7 |
| 2008/0243836 A1 * | 10/2008 | Miyoshi | ............ | G06F 17/30011 |
| 2008/0319946 A1 * | 12/2008 | Heyraud | ................ | G06Q 10/02 |
| 2009/0319523 A1 * | 12/2009 | Anderson et al. | ................. | 707/6 |
| 2010/0235195 A1 * | 9/2010 | Firminger et al. | ................ | 705/3 |
| 2011/0202361 A1 * | 8/2011 | Firminger et al. | ................ | 705/2 |
| 2011/0202511 A1 * | 8/2011 | Sityon | ............... | G06F 17/30958 707/706 |
| 2012/0203586 A1 * | 8/2012 | Blakely | ........................ | 705/7.12 |
| 2013/0097093 A1 * | 4/2013 | Kolber et al. | .................. | 705/321 |
| 2014/0108370 A1 * | 4/2014 | Andri | ................ | G06F 17/30749 707/706 |

* cited by examiner

*Primary Examiner* — Hanh Thai
(74) *Attorney, Agent, or Firm* — F. Chau & Associates, LLC

(57) ABSTRACT

According to an exemplary embodiment of the invention, a method of discovering new service providers includes: displaying a graphical user interface that enables a user to enter current search data to perform a search for service providers of a service, performing a search using the current search data to generate a list of service providers that provide the service, and filtering out the service providers from the list that were previously employed by a given entity.

15 Claims, 6 Drawing Sheets

FIG. 2

Clear  Save
201    202

Keep Alive: ☐

Radius Search: 75 mi    203

Search Category Type: Manually Enter Search Terms    204

Manual Terms: Handyman Services    205

FM Vendor Trades: 206

Select options
☐ Select All
☐ Asphalt Maintenance
☐ Carpentry
☐ Ceiling Repair
☐ Ceiling Tile Replacement (sub of ceiling Repair)
☐ Concrete and Masonry Work
☐ Door Repair
☐ Door/Gate Repairs (sub cat of Door Repair)

search  207

FIG. 3

Web Search Criteria: Search Term: handyman services

Resultset: 137 match(s)

Radius ▼ [50 mi] Prospect Sourcing ▼ [Web Search]

| Vendor | Location | | | | Vendor | Contact Information |
|---|---|---|---|---|---|---|
| Name | Address | City | St | Dist. | Source | Phone |
| The Ultimate Craftsman - Home Remodeling Handyman | 401 Lafayette St | Williamsburg | VA | 0.37 | Yahoo | (757) 869-9872 |
| Darith Construction LLC | | Williamsburg | VA | 0.38 | Yahoo | (757) 645-5609 |
| Probuilt Home Remodeling | | Williamsburg | VA | 0.38 | Yahoo | (757) 784-0619 |
| Danny's Heating & Air and Home Improvements | | Williamsburg | VA | 0.38 | Yahoo | (757) 338-0308 |
| Anointed Touch Handyman Services | 327 Merrimac Trail, Williamsburg, VA | Williamsburg | VA | 1.52 | Google | (757) 880-4689 |
| Anointed Touch Handyman Services | 327 Merrimac Trl | Williamsburg | VA | 1.52 | Yahoo | (757) 880-4689 |
| Anointed Touch Handyman Services | 327-9A Merrimac Trail | Williamsburg | VA | 1.52 | YP | (757) 880-4689 |
| Avatar Studios Limited | 619 Queens Creek Rd | Williamsburg | VA | 2.26 | Yahoo | (757) 565-5892 |
| Avatar Studios Ltd | 619 Queens Creek Rd | Williamsburg | VA | 2.29 | YP | (757) 565-5892 |
| All Pro Restoration | 117 Leon Dr | Williamsburg | VA | 2.37 | Yahoo | (757) 258-3580 |
| All Pro Restoration | 117 Leon Dr | Williamsburg | VA | 2.38 | YP | (757) 258-3580 |
| Rob's Jobs | | Williamsburg | VA | 2.76 | Yahoo | (757) 645-4233 |
| Olde Towne Handymen | 8 Cedar Cir | Williamsburg | VA | 3.5 | YP | (757) 644-9211 |
| Jlghandyman | 12 Tempsford Ln | Williamsburg | VA | 3.9 | Yahoo | (757) 303-5733 |
| Case Handyman & Remodeling | 5610 Mooretown Rd, #F | Williamsburg | VA | 3.87 | Yahoo | (757) 220-9046 |
| BUMA TOTALCARE | Pobox 6242 | Williamsburg | VA | 4.1 | Yahoo | (757) 564-0444 |
| Probuilt Home Remodeling | 5610 Mooretown Rd, #142 | Williamsburg | VA | 4.88 | Yahoo | (757) 784-0619 |
| Trautner Home Improvements | PO Box 744 | Lightfoot | VA | 5.36 | YP | (757) 784-6381 |
| Rob's Jobs Incorporated | | Jamestown | VA | 5.4 | Yahoo | (757) 645-4233 |
| Olde Towne Landscaping and Design | 8 Cedar Cir | Williamsburg | VA | 5.64 | Yahoo | (757) 644-9211 |
| Hertzler Brothers Incorporated | 4925 Centerville Rd | Williamsburg | VA | 5.67 | Yahoo | (757) 565-4565 |
| Bowers Painting Williamsburg's | 6319 Centerville Rd | Williamsburg | VA | 5.74 | YP | (757) 565-0974 |
| Bowers Painting Williamsburg's | 6319 Centerville Rd | Williamsburg | VA | 5.76 | Yahoo | (757) 565-0974 |
| Reflections Home Improvement, LLC | | Williamsburg | VA | 6.02 | YP | (757) 927-5564 |
| Sonshine Home Improvement | 3286 Westover Rdg | Williamsburg | VA | 6.23 | Yahoo | (757) 564-8493 |
| Yorktown's Handyman LLC | | Yorktown | VA | 8.91 | Yahoo | (757) 898-2697 |

PROVIDING INTELLIGENT SERVICE PROVIDER SEARCHING AND STATISTICS ON SERVICE PROVIDERS

BACKGROUND OF THE INVENTION

1. Technical Field

The present disclosure relates generally to service provider searching, and more particular to searching for new service providers and providing statistics on service providers.

2. Discussion of Related Art

There are numerous service providers that provide services such as brick work, carpentry, plumbing, painting, lawn cutting, sprinkler installation/maintenance, snow removal, heating ventilation air conditioning (HVAC) system installation/maintenance, etc. The skill level, cost, and quality of these service providers may vary considerably.

When an operator of a business needs a certain job to be performed, the operator performs a search of the internet. In order to perform such a search, the operator needs to choose specific search terms. However, if can be difficult to determine which search terms are most likely to yield the needed service provider. Further, if a business has multiple operators, time is wasted if each operator were to perform the exact same search. For example, if two operators of the business are both looking for carpenters, time is wasted if they both use the same search terms.

Thus, there is a need for a more efficient mechanism to search for service providers.

SUMMARY OF THE INVENTION

According to an exemplary embodiment of the invention, a method of discovering new service providers includes: displaying a graphical user interface that enables a user to enter current search data to perform a search for service providers of a service, performing a search using the current search data to generate a list of service providers that provide the service, and filtering out the service providers from the list that were previously employed by a given entity.

According to an exemplary embodiment of the invention, a computer system for acquiring information about service providers includes a server comprising a memory storing a computer program and a processor executing the computer program. The computer program of the server is configured to output a first computer message to a client to format presentation of a graphical user interface GUI on the client, the GUI enabling a user of the client to enter current search data to perform a search for service providers of a service. The client sends a second computer message to the server including the current search data. The computer program of the server performs a search using the current search data in the second computer message to generate a list of service providers that provide the service. The computer program of the server filters out the service providers from the list that were previously employed based on prior recorded information.

According to an exemplary embodiment of the invention, a computer system to manage service providers includes a server comprising a memory storing a computer program and a database and a processor executing the computer program. The database stores a list of service providers, indicating at least one service provided by each service provider and a corresponding score. The computer program of the server is configured to enable a user to search for service providers of a service, and a result of the search includes only those service providers that have a score in the list above a threshold score.

The computer program enables a given service provider access to the score of the given service provider for a given service.

BRIEF DESCRIPTION OF THE DRAWINGS

Exemplary embodiments of the invention can be understood in more detail from the following descriptions taken in conjunction with the accompanying drawings in which:

FIG. 2 illustrates an example of a GUI that may be used to perform a search for service providers.

FIG. 3 illustrates an example of results that may be output when the search is performed.

DETAILED DESCRIPTION

Exemplary embodiments of the invention are discussed in further detail with reference to FIGS. 1-6. This invention may, however, be embodied in different forms and should not be construed as limited to the embodiments set forth herein.

It is to be understood that the systems and methods described herein may be implemented in various forms of hardware, software, firmware, special purpose processors, or a combination thereof. In particular, at least a portion of the present invention may be implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent' system components and process steps depicted in the accompanying Figures may be implemented in software, the connections between system modules (or the logic flow of method steps) may differ depending upon the manner in which the present invention is programmed. Given the teachings herein, one of ordinary skill in the related art will be able to contemplate these and similar implementations of the present invention.

Figure 1:
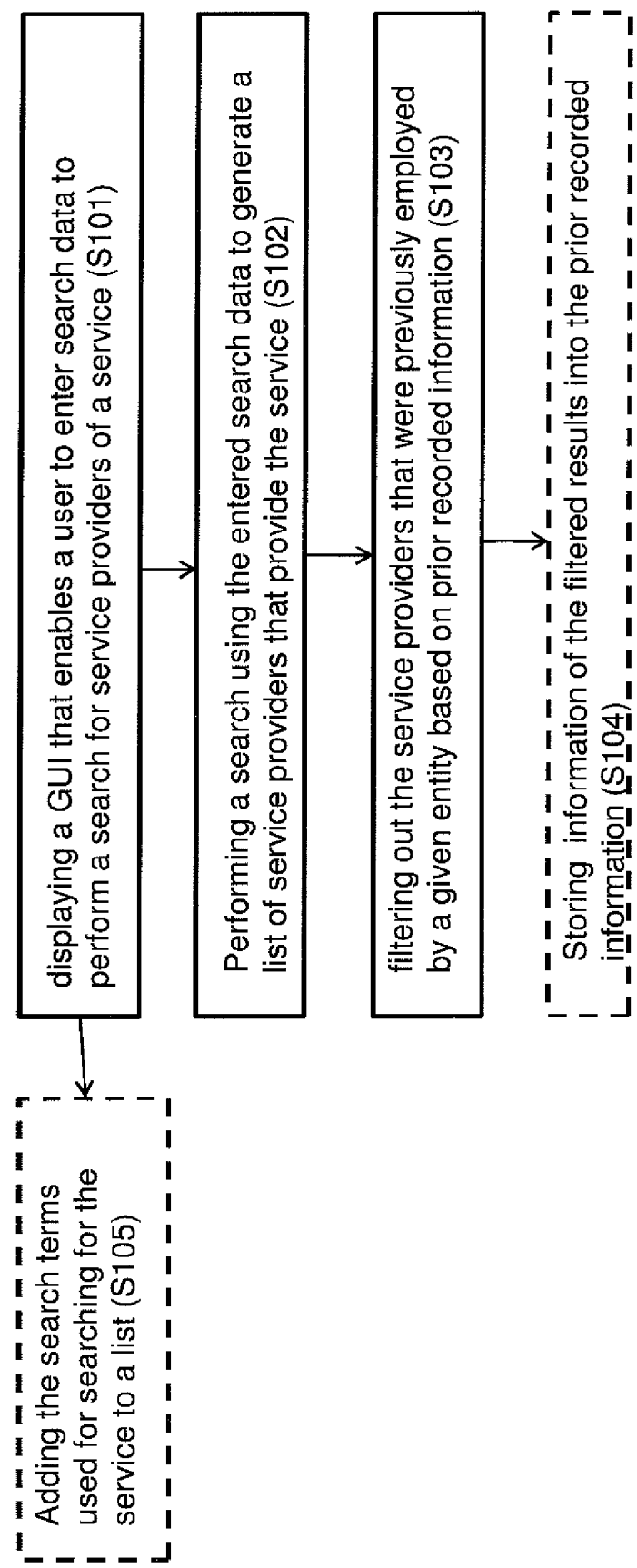
FIG. 1 illustrates a method of searching for new service providers according to an exemplary embodiment of the invention.
Figure 4:
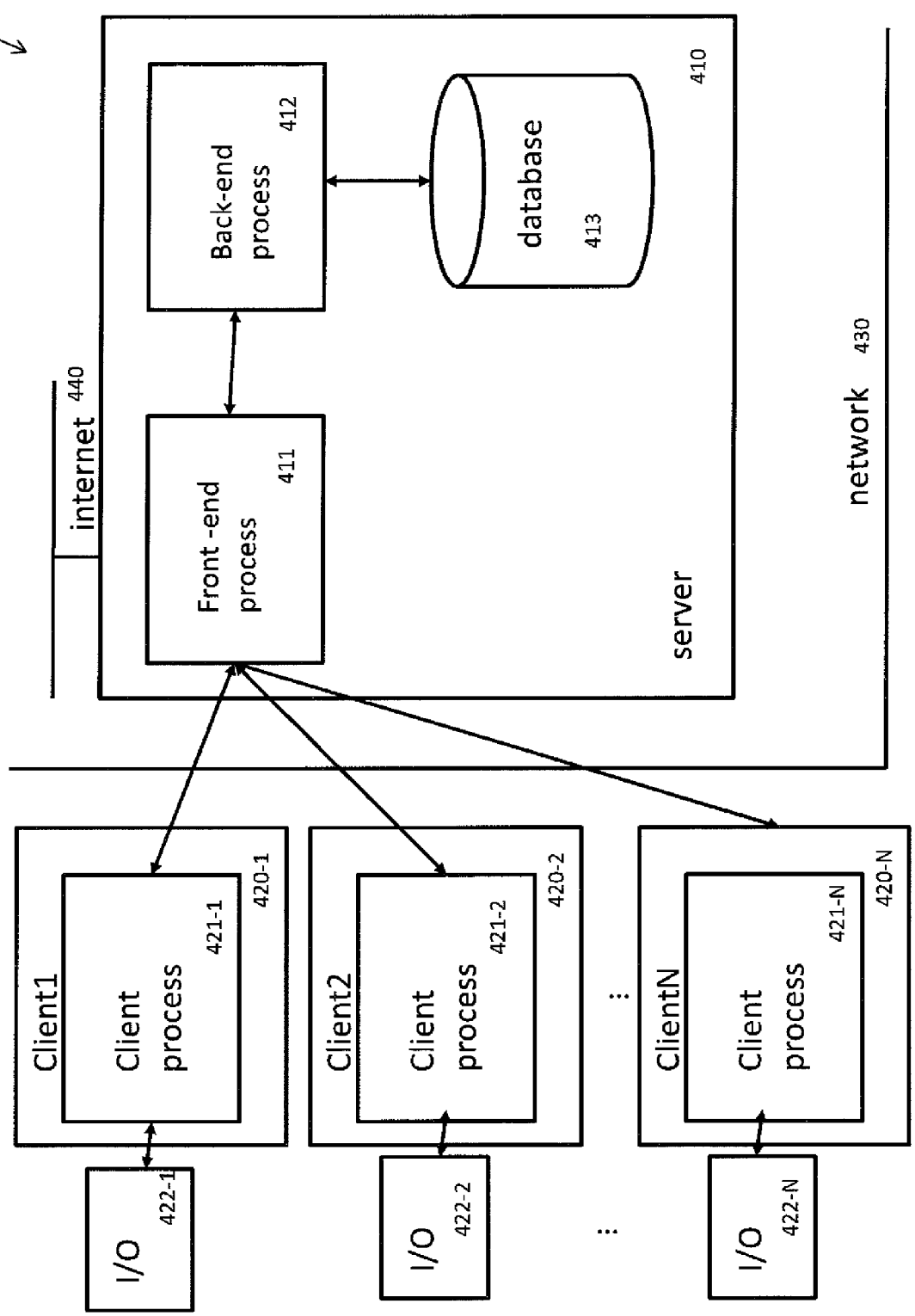
FIG. 4 illustrates a system according to an exemplary embodiment of the invention, in which the method of FIG. 1 may be executed.

FIG. 1 illustrates a method of searching for new service providers, according to an exemplary embodiment of the invention. FIG. 4 illustrates a system 400 according to an exemplary embodiment of the invention that may execute the method of FIG. 1. The method of FIG. 1 will be discussed below with respect to the system 400 of FIG. 4.

Referring to FIG. 1, the method includes: displaying a graphical user interface (GUI) that enables a user to enter search data to perform a search for service providers (S101). The search portion of the GUI may include a search term field for entry by the operator of one or more search words, characters, or numbers, and one or more logical connectors (e.g., "carpentry and painting").

In an exemplary embodiment, the search data includes a selected search engine and the search portion of the GUI enables the user to select the search engine for performing the search (e.g., Google, Bing, etc.).

In an exemplary embodiment, the search portion of the GUI includes geographical filters. For example, the search portion of the user may enable the user to limit his search to a certain geographical radius (e.g., carpenter's within 10 miles) or to a certain geographical region (e.g., Nassau county, Farmingdale, etc.).

FIG. 2 shows an example of the GUI. As shown in FIG. 2, the GUI includes a clear button 201, a save button 202, a radius search menu 203, a search category type menu 204, a manual terms entry field 205, a trades menu 206, and a search button 207.

The radius search menu 203 enables the user to limit their search by a selected geographic radius from the user's current location or a pre-defined location, such as the location of the company of the user. The search category type menu 204 enables the user to select a manual search or to select an automatic search, which considers the terms. The manual terms entry field 205 enables a user to enter one or more search terms. In an exemplary embodiment, the manual terms entry field 205 is hidden or disabled when the automatic search is selected.

The trades menu 206 enables the user to select one or more trades (attributes) to search for. The trades/attributes may have been collected previously from vendors that already perform these trades or have these attributes. For example, if the user is interested in finding a service provider that does carpentry and ceiling repair, the user selects the appropriate choices from the trades menu, and selects the search button 207 to perform the search.

In the manual search, a search is performed for service providers within the selected radius who perform the selected trades/attributes using the manually entered search terms. In the automatic search, a search is performed for service providers within the selected radius who perform the selected trades using previously collected search terms that have been used in the past to search for service providers who perform the selected trades.

The manually entered search terms can be added to the collected search terms. For example, if the user had selected "carpentry" in the trades menu 206 and entered the term "wood worker" in the manual terms entry field 205, the term "wood worker" could be added to the collected search terms for the trade of "carpentry".

The data entered into the GUI can be cleared by selecting the clear button 201, and search criteria for a given search can be saved by selecting the save button 202. The GUI may include a selectable button ("keep alive") that is used to make selected search criteria sticky. For example, if the user had entered a search for vendors that perform asphalt maintenance within 50 miles, and also selected keep alive, the next time the user performs a search for vendors that do carpentry within 75 miles, the current search would search for vendors that perform both asphalt maintenance within 50 miles and carpentry within 75 miles. By deselecting the keep alive, the current search does not consider previously entered search criteria.

The searches are searches of the Internet using one or more search engines (e.g., Google, Bing, Yahoo, Yellowpages, etc) of a search engine group. A search engine group includes one or more search engines to be used in each search and may be predefined in the system. An exemplary embodiment of the mechanism for performing the searches and extracting data from the results will be discussed in more detail below.

The invention, however, is not limited to the GUI illustrated in FIG. 2, as certain data entry fields, menus, buttons, etc. may be omitted, removed, or re-arranged. For example, the GUI may include an additional menu that enables the user to select the specific search engines (e.g., Google, Bing, Yahoo, Yellowpages, etc.) that are to be used in the searching.

FIG. 3 illustrates an example of the results that can be returned by the above-described searches. For example, the results may be formatted to include data such as the name of the service provider (vendor), the location of the service provider (e.g., street address, city, state, distance from user or company to service provider, the identity of the search engine used to retrieve the search provider, and the contact information of the service provider (e.g., phone number, cell phone number, e-mail address, etc.). As shown in FIG. 3, the same service provider may come up in searches performed using different search engines.

The GUI may be presented on a display of the system 400 shown in FIG. 4 as an example. The system 400 includes a server 410 communicating with one or more client computers 420-1, 420-2, . . . , 420-N across a computer network 430. Each client computer includes an I/O unit (e.g., 422-1, 422-2, . . . , 422-N) which includes an input unit such as a keyboard and a mouse to launch a client process (e.g., 421-1, . . . , 421-2, . . . , 421-N) to start the GUI and an output unit such as a display that presents the GUI.

The computer network 430 may be a private wired or wireless network, or a public wired or wireless network such as the Internet.

The server 410 is configured to communicate across the Internet 440 to perform the searches. The server 410 includes a Front-end process 411 that communicates with one or more of the client processes 421-1, 421-2, . . . , 421-N. The Front-end process 411 provides messages for formatting presentation of the GUI.

The search portion of the GUI may include a selectable button (e.g., see search button 207 of FIG. 2) that initiates the search once all of the necessary search data has been entered. For example, once the search data has been entered into the search portion of the GUI and the search button 207 has been selected, a computer message may be formatted with the entered search data and sent to a remote server (e.g., 410). For example, the computer message may include the radius of the search, indicate whether a manual/automatic search is to be performed, include manual search terms to be used in the manual search, a list of the desired trades, etc.

In an exemplary embodiment, the clients and the server 410 are located on the same machine, and so the server 410 is local relative to the clients. The message may be received by the Front-end process 411 for forwarding to the Back-end process 412 or the message may be sent directly to the Back-end process 412 without passing through the Front-end process 411.

In an exemplary embodiment, the Front-end process 411 extracts search data fields from the message (e.g., search radius, indicator of whether manual or automatic search is to be performed, search terms, filter values, identities of search engines to be used in the search, etc.), and sends the contents of these fields to the Back-end process 412.

The method of FIG. 1 further includes performing a search (e.g., by the Back-end process 412) using the entered search data for service providers (vendors) that provide the desired services or trades (S102). The search may use one or more pre-defined search engines. In an exemplary embodiment of the invention, a search includes using at least search provider or search engine, such as Google, Bing, Yahoo, Yellowpages, etc. However, the invention is not limited to any particular search engine, and can be adapted to use additional search engines.

In an exemplary embodiment, the Back-end process 412 makes a Representational State Transfer (REST) call to a search provider via an Application Programmer Interface (API) of the corresponding search provider to perform a given search.

Since the API of each search provider is different, the Back-end process 412 is adapted to send each supported search provider API any necessary parameters specific to that search provider. In an exemplary embodiment, the Back-end process 412 supports the Places API from Google, the Phonebook API from Bing, the LocalSearch API from Yahoo, and the Search API from the Yellowpages.

In an exemplary embodiment, the REST call is formatted to perform a search using Google by communicating through its Places API, information such as the latitude and longitude of the user/company, the distance or range to search within, the search terms to be used, etc. A sub REST call can then be used on the results returned by the initial REST call to get the individual details. Google also returns all results using a single high level call.

In an exemplary embodiment, the REST call is formatted to perform a search using Bing, Yahoo, or the Yellow pages by communicating through the Phonebook API, the LocalSearch API, and the Search API, respectively, information such as the latitude and longitude of the user/company, the radius to search within, and the search terms. The results include a result count or a listing count and individual results corresponding to the count. The individual results can be parsed based on the count. For example, a process may include a loop that continues to extract each result until a looping variable has reached the count.

In an exemplary embodiment, for each search result, XML parsing is used to strip out the needed parameters and is either used directly or translated into a common set of parameters. Each set of results may be grouped together to perform mass import into the database 413. In an exemplary embodiment, only results for service providers that are unique are stored into a section (e.g., a table of prospects) of the database 413, but all statistics are stored into another section (e.g., a table of statistics) of the database 413. For example, if a first search using first search terms for a service provider performing carpentry yielded John Smith through a Google search and a second search using second other search terms for a service provider performing carpentry also yielded John Smith, John Smith is not added again to the table of prospects, but the fact that John Smith showed up again in a Google search, is added to the table of statistics. For example, the table of statistics could indicate that John Smith appeared twice so far in Google Searches for carpentry. As an example, the database 413 is a relational database.

Referring back to FIG. 1, after the searches have been performed, the method includes filtering out the service providers (vendors) based on prior recorded information, such as whether the service providers were previously employed by a given entity (e.g., person, company, etc.) (S103). The prior recorded information is stored in the database (e.g., 413).

The Back-end process 412 retrieves the prior recorded information from the database 413 to be used in the filtering. In an exemplary embodiment, the prior recorded information indicates at least one of the following for each service provider a) the identity of the service provider (e.g., first name, last name, business name), b) the address of the service provider (e.g., street, town, county, state, country, latitude, longitude, etc.), c) contact information for the service provider (e.g., phone number, e-mail address, fax number, etc., d) service information indicating which services/trades provided by the service provider (e.g., carpentry, painting, plumbing, gardening, snow removal, electrical, etc.), e) hire information, f) legal information, g) price information, h) quality information, i) timeliness information, j) communications, etc.

In an exemplary embodiment the hire information indicates whether a provider/vendor was previously employed by a given entity (or currently employed or under contact with the entity), or has never been previously been hired by the company (or is not currently employed or under contract). The hire information may additionally indicate the identity of the entity that is currently employing or previously employed the service provider. The hire information may indicate the date the service provider was hired.

In an exemplary embodiment, the legal information indicates at least one of whether the service provider has liability insurance, what licenses the service provider has to operate particular machines/vehicles, and whether the provider has been convicted of a felony or another crime that would prevent the company from employing the provider, etc.

In an exemplary embodiment, the price information indicates the price that the service provider charges for each service or an overall price qualifier (e.g., expensive, reasonable, cheap, etc.). The price information may include his standard rate, his overtime rate, his holiday rate, etc.

In an exemplary embodiment, the quality information indicates the overall quality of the service provider (e.g., good, average, excellent, bad, etc.) or the quality of the service provider in each service he provides (e.g., good carpenter, bad plumber etc.).

In an exemplary embodiment, the timeliness information indicates the overall timeliness of the service provider (e.g., always on-time, rarely on-time, usually on-time) or the timeliness of the services he provides (carpenter work always on-time, plumbing work rarely on-time).

In an exemplary embodiment, the communication information indicates a history of communications/transactions between the company and the service provider (e.g., hired provider in June 2002, contacted provider in December 2012 to inquire about availability, etc.).

The prior recorded information may also indicate whether the service provider is on a "do not call" list, whether the service provider provides emergency services, etc.

Since an embodiment of the invention filters out the server providers that have never been previously hired, the embodiment can be used to efficiently discover new service providers so only these newly discovered service providers are contacted. For example, it may be assumed that information, such as services provided, availability, and cost of services are already present in the database for those providers that have been previously hired by the company. Thus, if it is the goal of a user to contact new service providers, it would be inefficient to include previously hired service providers in the results.

The Back-end process 412 searches the database 413 to determine whether the service providers discovered by the search are already present in the database. For example, the Back-end process 412 could perform one or more SQL select statements on one or more tables of the database 413 storing information about prior recorded service providers to determine whether a service provider discovered by the search is present in the database, and retrieve the data stored in the database 413 for that service provider.

For example, assume a Google search for painters yielded John Smith at address A with a first contact number, Fred Thomas at address B with a second contact number, and George Wallace at address C with a third contact number. Then, the Back-end process 412 would search the database 413 for the above service providers, namely John Smith, Fred Thomas, and George Wallace. For convenience of explanation, it is assumed that the database 413 either has none or one matching entry for each of these service providers. If Fred Thomas is not present in the database 413, Fred Thomas along with at least his contact information from the Internet search is added to the filtered results, so an operator knows how to contact him to inquire about his availability for painting.

In an exemplary embodiment, the database 413 includes an entry for each service provider discovered by the Internet searches or manually entered, where each entry includes at least some of the above-described prior recorded information.

In an exemplary embodiment, an entry includes additional data such as whether the service provider is blacklisted and the reason for the blacklisting (e.g., "felony convictions", etc). In an exemplary embodiment, in addition to filtering out the previously employed service providers, the service providers not previously employed who have been blacklisted are also filtered out.

The method of FIG. 1 may further include storing information of the filtered results in the database (S104). For example, based on the above example, Fred Thomas is not already present in the database. Thus, the Back-end process 412 creates a new entry for Fred Thomas in the database 413. This new entry may include the identity of the service provider (e.g., Fred Thomas), his contact information (e.g., initial search may have yielded phone number, fax number etc.), his hiring status as "never hired previously", and potentially the services he provides if they could be parsed from the search results.

If John Smith is already in the database 413, he is added to the filtered results if his hiring information indicates he was never hired previously. For example, a second user (e.g., using client2 420-2) may have performed a different search for painters yesterday that discovered John Smith and added him to the database, but since the second user had not yet hired him, his hiring information is still set to "never hired". If George Wallace is also in the database 413, but his hiring information indicates he was previously hired or is a current employee of the company, he is not added to the filtered results.

The GUI may automatically filter out service providers previously hired or may include a selectable option, which allows the user to specify whether the current search should filter out such service providers.

The Back-end process 412 provides the filtered results to the Front-end process 411 for output to the client process (e.g., 421-1) that requested the search for display. For example, based on the above search for painters and the filtered results, the client process displays Fred Thomas, John Smith and their contact information.

The user can manually contact each of the service providers provided in the displayed results to learn about the service provider (e.g., services provided, costs of services, licenses held, availability, etc.) and potentially hire the service provider.

In an exemplary embodiment, the user automatically contacts one of the service providers by selecting its entry in the filtered results. For example, selection of the entry may start a voice over IP program that dials the phone number of the service provider to enable the user to speak with the service provider using microphone and speakers, or a headset (e.g., part of I/O 421-1). In an exemplary embodiment, selection of the entry enables the user to automatically send a text message, an instant message, a social network message, or an e-mail message to the service provider.

In an exemplary embodiment, the GUI includes a mechanism for entering the learned service provider information (e.g., service provider also does plumbing) and/or to update his hiring information (e.g., hired, do not call, etc.) for each of the service providers returned in the filtered results into the database 413. For example, in an exemplary embodiment, selection by the user on a service provider entry of the filtered results displays a window enabling the user to enter information for one or more information fields corresponding to an entry for the corresponding service provider in the database 413.

If the user is unable to reach the service provider, the user can enter information documenting efforts to contact the service provider (e.g., "contacted service provider on Sep. 21, 2012", etc.) for storage in the database 413 for association with the service provider. The GUI may include a selectable option that enables a user to filter out potential new service providers who were contacted without success more than a pre-determined number of times. For example, there is no point in continuously contacting a service provider that is unreachable.

In an exemplary embodiment, the method may further include adding the search terms used to perform the search for a service provider of the service to a list that is stored in a database (S105). For example, the list may include an entry for each service and the search terms used to search for that service. The entry may be structured to include pairs of search terms and the search engine used. Each time the current user or a new user performs a new search for the same service, an entry in the list for that service will include any new search terms and search engine pairs entered.

For example, as shown in FIG. 3, the GUI includes a trades menu 206 for selecting one or more trades (e.g., services) among several available trades for searching, and a manual terms entry field 205 for entering the search terms. For example, if the user wants to search for a carpenter, the user selects "carpentry" from the trades menu 206 and enters terms into the manual terms entry field 205 he believes are likely to result in new service providers that perform carpentry (e.g., "wood work", "carpenter", "repairing wood fence", etc.). Thus, in an exemplary embodiment, the database 413 stores an entry for each trade (e.g., asphalt maintenance, carpentry, ceiling repair, etc.) and all of the search terms tried, or the search terms tried in combination with the search engine selected. Since some of the search terms tried may not provide results, they can be omitted from storage. For example, if the user misspells carpenter as carpentre and enters this word in his search for carpenters, and it does not provide a carpenter in the search results, the term carpentre need not be added to the list of search terms associated with the trade (service) of carpentry.

Figure 5:
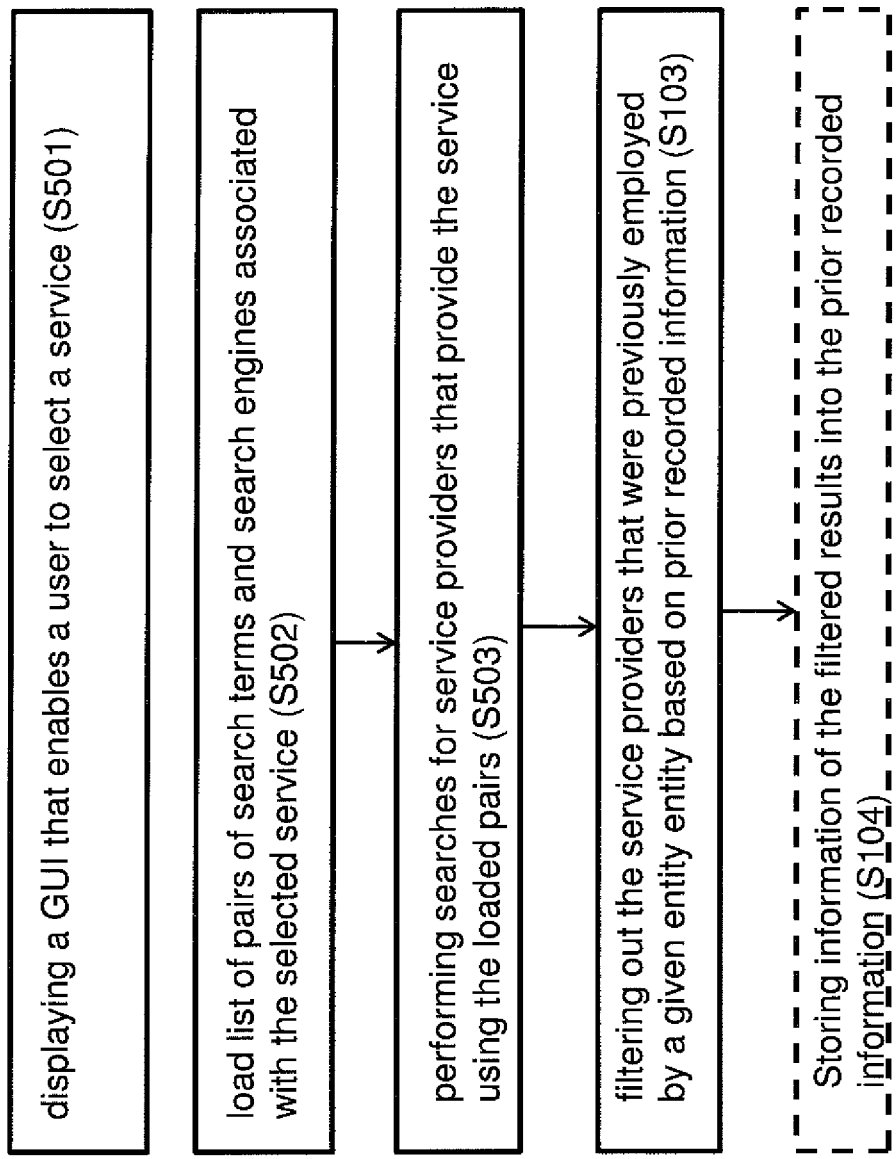
FIG. 5 illustrates a method of searching for new service providers according to an exemplary embodiment of the invention.

In an exemplary embodiment, the search performed by the Back-end process 412 is an aggregate search (e.g., the automatic search) that uses prior stored search terms that were entered for that trade (service) to perform the search. FIG. 5 illustrates a method of discovering new service providers based on these prior stored search terms. Referring to FIG. 5, the method includes displaying a GUI that enables a user to select a service (S501), loading list pairs of search terms and search engines associated with the selected service (S502), and performing searches for service providers that provide the service using the loaded pairs (S503). Like the method of FIG. 1, it can be determined whether service providers in the results of these searches have been previously employed by determining whether prior recorded information for these service providers is present. Then, like the method of FIG. 1, the service providers from the results that were previously employed may be filtered out (S103) and information from the filtered results may used to update the prior recorded information (8104).

In an exemplary embodiment, in addition to the user selecting a service in step S501, the user also enters search terms and optionally a search engine, and in addition to the searched performed based on the loaded pairs, a search is performed using the entered search terms and search engines.

In an exemplary embodiment, the GUI can display all the previously entered search terms used to search for a particular service so the user knows if he is entering a duplicate term.

An aggregate search for a service provider that provides a service of painting could then include, for example, include a Google search for painter, a Google search for paints, a Bing search for painter, and a Bing search for paints. In an exemplary embodiment, the database 413 only stores the pairs of search terms and search engines that were best for retrieving results for a given service. For example, if no results were returned for the Google and Bing searches for paints, the next time an aggregate search for a service provider who performs painting is performed, the search (e.g., see S503) would only include the Google and Bing searches for painter. Further, those searches that returned less than a threshold amount of results may be omitted from being stored. For example, if the Google search for painter retrieved 12 results and the Bing search for painter retrieved 2 results, and the threshold is set to 3, the Bing search for painter would not be part of the next aggregate search for a service provider that provides a painting service.

In an exemplary embodiment, data in the database 413 is full Text, and the database 413 can be searched by applying fuzzy search criteria (wild card) along with search terms entered into the GUI. For example, if the user were to misspell carpenter in the manual terms entry field 205 as carpentex, the system can replace some of the letters of the entered term with a wildcard (e.g., carpent*), and search the database 413 for any service providers that provide services that begin with "carpent". If the user enters different terms in their search, the system can break them up and place wild cards between them to find similar matches to any of the terms.

In an exemplary embodiment, the GUI enables the user to present a list of service providers for a given service in an order based on internally generated scores. Those service providers that do not exceed a threshold score may be omitted from the list. The service providers not previously hired may also be omitted from the list. The rule for generating the score may be configured by a supervisor. For example, the Backend process 412 may manage an account for a supervisor that enables the supervisor to logon to the server 410 to create the rule. The rule for calculating a score for a service provider may include a sum of sub-scores, where each sub-score corresponds to a different factor and a different weight is applied to each sub-score. The factors, for example, may include quality of work, timeliness of work, cost, etc. For example, a sub-score for each factor could be a number from 1 to 10. For example, a rule for generating a score that favors quality Q and cost C over timeliness T could be represented by Score=2*Q+2*C+1*T.

In an exemplary embodiment, the server 410 is capable of maintaining statistics and providing these statistics to users including the service providers. For example, the server 410 may manage accounts for service providers who logon to these accounts to view these statistics. The statistics may include the score of the service provider for each service, whether the score is considered a good score (e.g., is it above average, average, below average, etc.) and the sub-scores used to calculate the score. For example, if a service provider learns he is below average for painting and sees his timeliness sub-score is extremely low, he can take corrective action to improve his score to increase his chances of receiving more work.

The server 410 may also maintain statistics on what search engines found each service provider for each service or what search engines were best for finding each service provider for each service. For example, if Bing searches for painters yielded Fred Thomas but Google searches did not, this service provider would benefit from knowing that he needs to take corrective action to ensure that he appears in Google searches. In an exemplary embodiment, the database 413 include a statistics table having entries for each service provider, and a count for each search engine which corresponds to the number of times that service provider appeared in a search using that search engine or appeared in list returned by that search engine at a suitable point within the list. For example, if a search engine produces 2 pages of results, the service provider is more likely to be chosen for subsequent work if he appears on the $1^{st}$ page of results rather than the $2^{nd}$ page.

Figure 6:
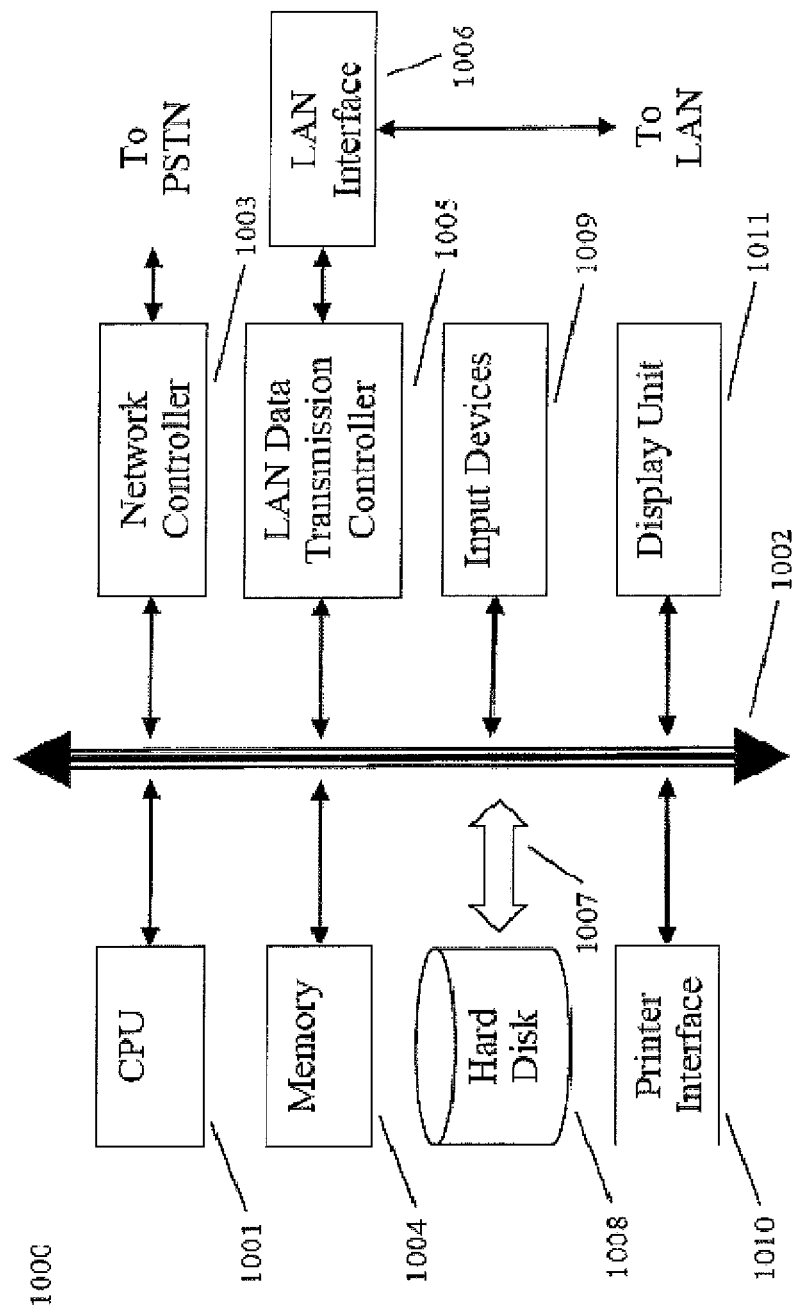
FIG. 6 illustrates an example of a computer system capable of implementing methods and systems according to embodiments of the present invention.

FIG. 6 shows an example of a computer system, which may implement the methods and systems of the present disclosure. The system and methods of the present disclosure, or part of the system and methods, may be implemented in the form of a software application running on a computer system, for example, a mainframe, personal computer (PC), handheld computer, server, etc. For example, the methods of FIG. 1 and FIG. 5 may be implemented as software application(s). These software applications may be stored on a computer readable media (such as hard disk drive memory 1008) locally accessible by the computer system and accessible via a hard wired or wireless or wireless connection to a network, for example, a local area network, or the Internet. For example, the server 410 shown in FIG. 4 may correspond to the computer system shown in FIG. 6.

The computer system referred to generally as system 1000 may include, for example, a central processing unit (CPU) 1001, a GPU (not shown), a random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007. CPU 1001 may be the computer processor that performs some or all of the steps of the methods described above with reference to FIGS. 1 and 5.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention.

What is claimed is:

1. A method of discovering new service providers, the method comprising:

displaying a graphical user interface GUI that enables a first user to enter current search data to perform a search for service providers of a service;

performing a current search using current search terms within the current search data and prior search terms within prior search data for the same service entered by a second user to generate a list of service providers that provide the service, wherein the current search terms differ from the prior search terms;
adding the current search data to the prior search data to generate combined search data including the current and prior search terms to enable a subsequent search for the same service to be performed using the combined search data if results of the current search includes a number of service providers for the same service exceeding a threshold number; and
filtering out the service providers from the list that were previously employed by a given entity.

2. The method of claim 1, wherein the filtering comprises:
loading prior recorded information;
determining whether a service provider in the list is present in the loaded information; and
filtering out the service provider if the service provider is present in the loaded information.

3. The method of claim 1, wherein the filtering comprises:
loading prior recorded information;
determining whether a given service provider in the list is identified in loaded information as being previously employed by the entity; and
filtering out the service provider if the given service provider is identified as being previously employed by the entity in the loaded information.

4. The method of claim 1, further comprising:
extracting contact information for a given service provider in the filtered results; and
automatically contacting the given service provider using the contact information.

5. The method of claim 1, wherein the search is performed on the Internet using a search engine included in the current entered search data.

6. The method of claim 1, further comprising performing the subsequent search using second search data entered by a third user for the same service and the combined search data to generate a second list of service providers that provide the service.

7. A computer system for acquiring information about service providers, the system comprising:
a server comprising a memory storing a computer program and a processor executing the computer program,
wherein the computer program of the server is configured to output a first computer message to a client to format presentation of a graphical user interface GUI on the client, the GUI enabling a first user of the client to enter current search data to perform a search for service providers of a service,
wherein the client sends a second computer message to the server including the current search data, and
wherein the computer program of the server performs a current search using current search terms within the current search data in the second computer message and prior search terms within prior search data for the same service entered by a second user to generate a list of service providers that provide the service, wherein the current search terms differ from the prior search terms, and
wherein the computer program adds the current entered search data to the prior search data to generate combined search data including the current and prior search terms to enable a subsequent search for the same service using the combined search data if results of the current search includes a number of service providers for the same service exceeding a threshold number, and
wherein the computer program of the server filters out the service providers from the list that were previously employed based on prior recorded information.

8. The computer system of claim 7, wherein the memory further stores a database, and the prior recorded information is stored within the database.

9. The computer system of claim 7, wherein the computer program filters out a given service provider from the list if the prior recorded information includes the given service provider.

10. The computer system of claim 7, wherein the computer program filters out a given service provider from the list if the prior recorded information identifies the given service provider as being previously employed by the given entity.

11. The computer system of claim 7, wherein the computer program is configured to format a third computer message including the filtered results and output the first message to the client.

12. The computer system of claim 11, wherein the filtered results include contact information for at least one service provider.

13. The computer system of claim 7, wherein the server is configured to communicate with the client across a computer network.

14. The computer system of claim 13, wherein the computer network is the Internet.

15. The computer system of claim 7, wherein the computer program performs the subsequent search using second search data entered by a third user for the same service and the combined search data to generate a second list of service providers that provide the service.

* * * * *